US008095781B2

(12) United States Patent
Angarai et al.

(10) Patent No.: US 8,095,781 B2
(45) Date of Patent: Jan. 10, 2012

(54) INSTRUCTION FETCH PIPELINE FOR SUPERSCALAR DIGITAL SIGNAL PROCESSORS AND METHOD OF OPERATION THEREOF

(75) Inventors: Vijayanand Angarai, Allen, TX (US);
Michelle Y. Che, Richardson, TX (US);
Asheesh Kashyap, Plano, TX (US);
Tracy Nguyen, The Colony, TX (US)

(73) Assignee: Verisilicon Holdings Co., Ltd., Santa Clara, CA (US)

( * ) Notice: Subject to any disclaimer, the term of this patent is extended or adjusted under 35 U.S.C. 154(b) by 541 days.

(21) Appl. No.: 12/204,769

(22) Filed: Sep. 4, 2008

(65) Prior Publication Data

US 2010/0058039 A1 Mar. 4, 2010

(51) Int. Cl.
*G06F 9/35* (2006.01)
*G06F 9/355* (2006.01)
(52) U.S. Cl. .................................. 712/220; 712/235
(58) Field of Classification Search .................. 712/220, 712/235
See application file for complete search history.

(56) References Cited

U.S. PATENT DOCUMENTS

| 6,564,313 | B1 | 5/2003 | Kashyap | |
|---|---|---|---|---|
| 6,829,702 | B1* | 12/2004 | Jeremiah et al. | 712/241 |
| 6,961,844 | B1 | 11/2005 | Stewart et al. | |
| 6,968,430 | B1 | 11/2005 | Kashyap | |
| 7,103,757 | B1 | 9/2006 | Kashyap | |
| 2003/0120896 | A1* | 6/2003 | Gosior et al. | 712/32 |
| 2003/0154349 | A1* | 8/2003 | Berg et al. | 711/137 |
| 2004/0139281 | A1* | 7/2004 | McDonald | 711/133 |
| 2004/0250045 | A1* | 12/2004 | Dowling | 712/10 |

* cited by examiner

*Primary Examiner* — Daniel Pan

(57) ABSTRACT

A next program counter (PC) value generator. The next PC value generator includes a discontinuity decoder that is provide to detect a discontinuity instruction among a plurality of instructions and a tight loop decoder that is provide to: a) detect a tight loop instruction, and b) provide a tight loop instruction target address. The next PC value generator further includes a next PC value logic having a plurality of inputs: a first input coupled to an output of the discontinuity decoder, and a second input coupled to an output of the tight loop decoder. The next PC value logic provides as an output, without a stall, a control signal that a next PC value is to be loaded with the tight loop instruction target address if: the discontinuity decoder detects a discontinuity instruction, and the tight loop decoder detects a tight loop instruction.

23 Claims, 4 Drawing Sheets

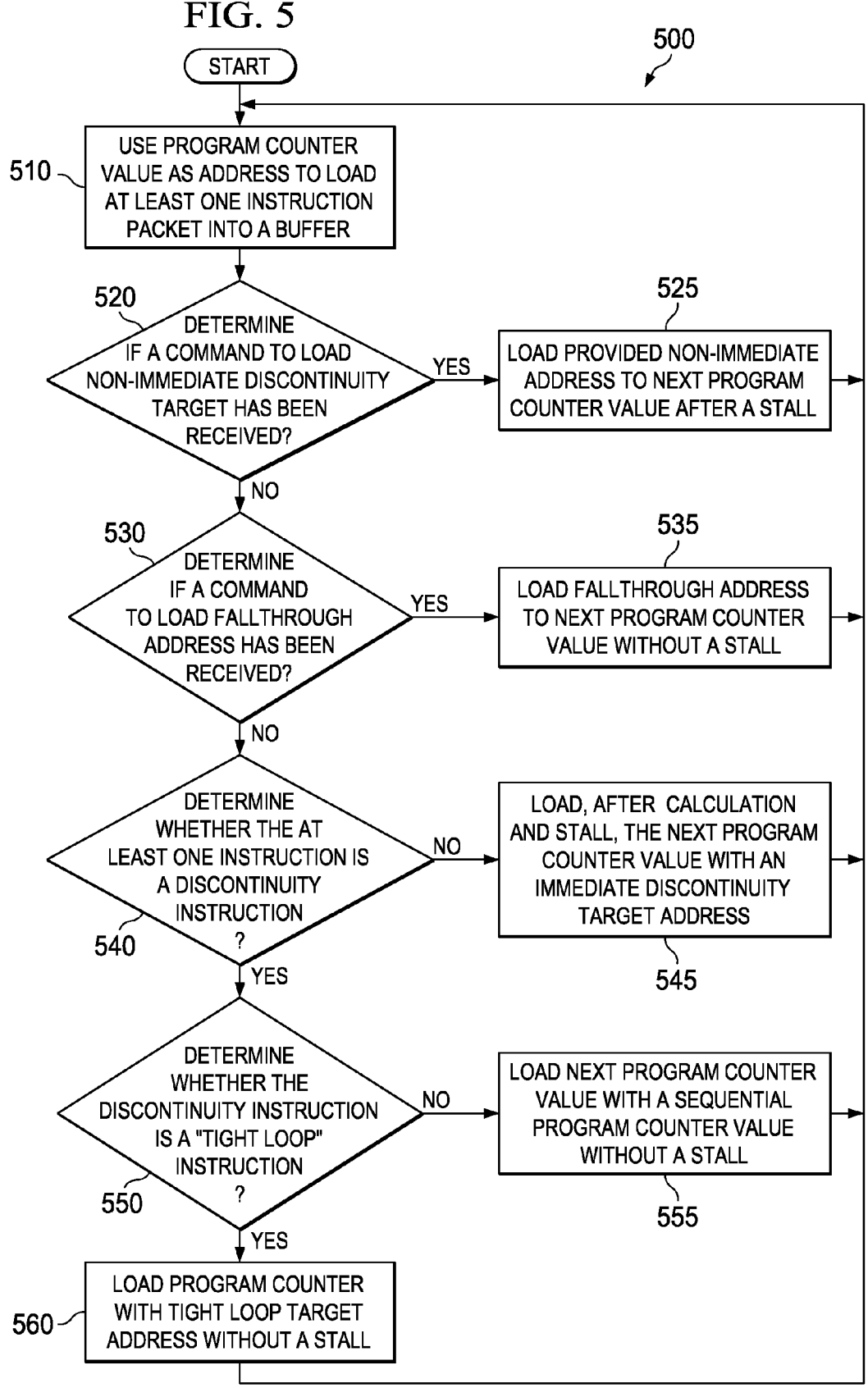

INSTRUCTION FETCH PIPELINE FOR SUPERSCALAR DIGITAL SIGNAL PROCESSORS AND METHOD OF OPERATION THEREOF

TECHNICAL FIELD

The invention is directed, in general, to detection of discontinuity instructions, and, more specifically, to detection of tight loop discontinuity instructions in a superscalar processor.

BACKGROUND

Digital signal processors (DSPs) are of an ever-increasing importance in today's signal processing environment. Over the last several years, DSPs have become an important tool, particularly in the real-time modification of signal streams. They have found use in all manner of electronic devices and will continue to grow in power and popularity.

An approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. These bubbles or stalls themselves cause substantial inefficiencies in a pipeline.

SUMMARY

To address the above-discussed deficiencies of the prior art, one aspect of the invention provides a method of use of a program counter (PC) value. The method includes loading an instruction packet of one or more instructions into a buffer through use of a PC value as an address of the instruction packet to select the instruction packet. The method also includes determining whether the instruction packet contains a discontinuity instruction. The method further includes loading, without a stall, the next PC value with a target discontinuity address of the discontinuity instruction if: a) the instruction packet contains the discontinuity instruction, and b) if the discontinuity instruction is a tight loop instruction.

Another aspect of the invention provides a next program counter (PC) value generator. The generator includes a discontinuity decoder that is provide to detect a discontinuity instruction among a plurality of instructions and a tight loop decoder that is provide to: a) detect a tight loop instruction; and b) provide a tight loop instruction target address. The next PC value generator further includes a next PC value logic having a plurality of inputs: a first input coupled to an output of the discontinuity decoder, and a second input coupled to an output of the tight loop decoder. The next PC value logic provides, without a stall, a control signal that a next PC is to be loaded with the tight loop instruction target address if: the discontinuity decoder detects a discontinuity instruction; and the tight loop decoder detects a tight loop instruction.

Yet another aspect of the invention provides a system for use with a program counter register (PC). The system provides a next PC value logic including: a) a discontinuity decoder that can detect a discontinuity instruction among a plurality of instructions; and b) a tight loop decoder that both: i) detects a tight loop instruction in a single clock cycle; and ii) provides a tight loop instruction target address in the same single clock cycle. The system further includes a partially decoded instruction buffer, a fully decoded instruction buffer, and loop fallthrough logic. The loop fallthrough logic is coupled to: a) an input of the next PC value logic, and b) the partially and fully decoded instruction buffers.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which:

FIG. 5 illustrates a flow diagram of one embodiment of a method of detecting discontinuities, including tight loop discontinuities.

DETAILED DESCRIPTION

It is recognized herein that discontinuities can be a substantial impediment to efficiently processing pipelined instructions. It is also recognized herein that, for at least some types of DSPs, a substantial portion of the discontinuity instructions are so-called "tight loop" instructions. A "tight loop" instruction is an instruction that establishes a loop that can be completely stored within a cache line buffer.

It is further recognized herein that by adapting a system or method to efficiently recognize the tight loop discontinuities, at least some of the problems associated with discontinuities in pipelines can be mitigated. One such mitigation is that a tight loop discontinuity can be accommodated having to stall a pipeline.

Figure 1:
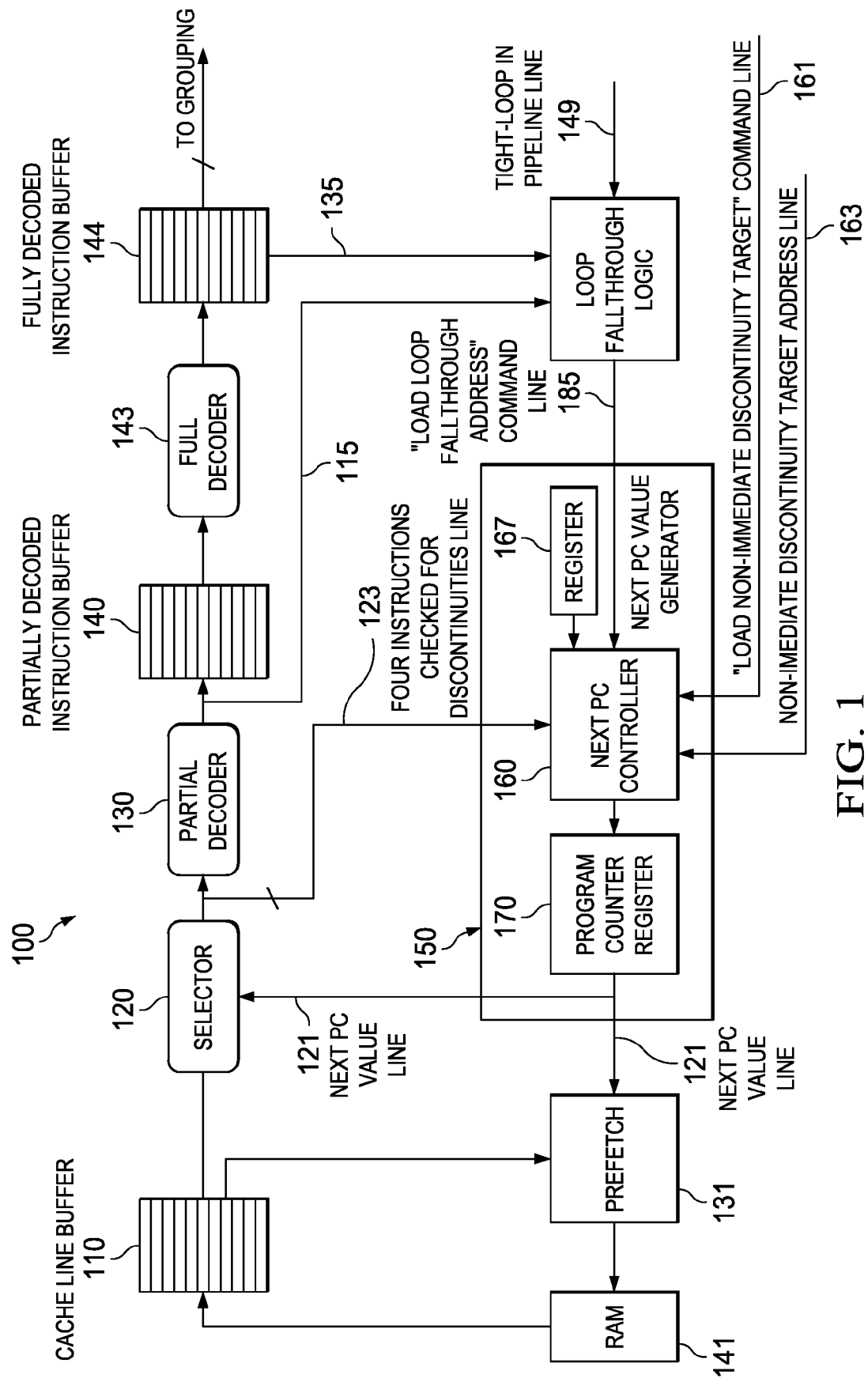
FIG. 1 illustrates a block diagram of one embodiment of a system with a next program counter (PC) value generator for detecting discontinuities, including tight loop discontinuities, constructed according to the principles of the invention.

Turning now FIG. 1, illustrated is a block diagram of a next PC value generator system, generally designated 100, having an architecture constructed according to the principles of the invention and in conjunction with peripheral circuitry. In the system 100 of FIG. 1, generally, a next PC value generator 150 evaluates various inputs and selected instructions to determine what a next PC value is to be.

In the event that a selected instruction is a tight loop discontinuity instruction, the next PC value generator 150 can generate a next PC value without a stall, wherein the updated PC value can be the target address of the tight loop. This can be advantageous, in that a substantial number of discontinuity instructions are tight loop discontinuity instructions, as discussed above. By adapting the next PC value generator 150 to detect tight loop discontinuity instructions, significant time and processing savings can result. Otherwise, a discontinuity instruction target address is calculated, resulting in a stall, as will be described below.

As is illustrated, a cache line buffer 110 is coupled to a selector 120. The selector 120 uses a PC value, generated by the next PC generator 150, as an address to select a set of instructions, such as four instructions, from the cache line buffer 110. An output of the selector 120 is coupled to a partial decoder 130. An output of the selector 120, a line 123, is also coupled to the next PC generator 150.

The partial decoder 130 is coupled to a partially decoded instruction buffer 140. The partially decoded instruction buffer 140 is coupled to a full decoder 143. The full decoder 143 is coupled to a fully decoded instruction buffer 144. The fully decoded instruction buffer 144 is coupled to a later grouping stage of a pipeline or pipelines of which the buffers 140, 144 are an earlier part. In some embodiments of the system 100, a separate pipeline of the system 100 uses each of the four instructions. In at least some embodiments, each of the four instructions are contained in an instruction packet.

In at least some embodiments, conveyance of the plurality of the instructions from the cache line buffer 110 to the partially decoded instruction buffer 140 is stalled when a discontinuity instruction that is not a tight loop discontinuity instruction is detected among the plurality of instructions conveyed to the next PC generator 150, as will be described below. A conveyance from the partially decoded instruction buffer 140 to the fully decoded instruction buffer 144 can be stalled by a dependency of a second instruction later in the pipeline or pipelines. Due to at least in part the aforementioned stalls, the partially decoded instruction buffer 140 can have instructions stored therein at a different average rate, for a plurality of clock cycles, than it is depleted of these instructions.

The partially decoded instruction buffer 140 is coupled through a line 115 to loop fallthrough logic 145. The fully decoded instruction buffer 144 is also coupled through a line 135 to the loop fallthrough logic 145. The loop fallthrough logic 145 also receives a count of loop dependencies from downstream in the pipeline through a line 149, as will be described in more detail, below.

Generally, the loop fallthrough logic 145 aggregates a count of all the iterations of a particular loop in the various stages of decoding, execution, etc. including counts of iterations that have already been executed. If the count equals the total number of iterations that are programmed for a particular loop, the "load loop fallthrough address" command is conveyed from the loop fallthrough logic through a "load loop fallthrough address command line 147" to the next PC generator 150. A fallthrough address may be generally defined as an address to which a tight loop, resumes once a selected number of iterations of the loop have occurred, as will be described in more detail in FIG. 3.

As discussed above, the next PC generator 150 has an output, the next PC value line 121, coupled to the selector 120, to select instructions based upon a next PC value generated by the next PC value generator 150. As discussed above, an output of the selector 120, such as a set of four partially instructions, is coupled into the next PC value generator 150. An output of the loop fallthrough logic 145 is coupled through line 147 to the next PC generator 150. The next PC value generator 150 receives a coupled load non-immediate discontinuity target command line 161, and also receives a coupled non-immediate discontinuity target address line 163.

Within the next PC value generator 150, an input of a loop fallthrough address register 167 is coupled to an output of the loop fallthrough logic 145. A next PC controller 160 of the next PC value generator 150 has input into it the four instructions selected line 123, an output of the fallthrough register 167, a load loop fallthrough address command line 147, the load non-immediate discontinuity target command line 161, and the noon-immediate discontinuity target address line 163. An output of the next PC controller 160 is coupled to a program counter register 170. An output of the program counter register 170 is coupled through the line 121 to both the selector 120, and a prefetch 131 as PC value line 121.

The prefetch 131 is coupled to the cache line buffer 110 and a random access memory (RAM) 141. Generally, the prefetch 131 fetches the instructions as referenced by the next PC value, reviews these instructions and determines, based upon various prefetch algorithms, which next instructions are most likely to be needed later on in the pipeline or pipelines. The prefetch 131 then uses these calculations to index the coupled RAM 141 to the next instructions into the coupled cache line buffer 110 for selection by the selector 120.

In at least some embodiments, the system 100 can work as follows. As will also be described in more detail regarding FIG. 2, below, the next PC controller 160 also includes a discontinuity decoder that can detect a discontinuity instruction among a plurality of instructions. The next PC controller 160 also includes a tight loop decoder that both: detects a tight loop instruction in a single clock cycle, and advantageously provides a tight loop instruction target address in the same single clock cycle. This advantageously helps to mitigate occurrences of stalls and bubbles in a computer system.

Figure 2:
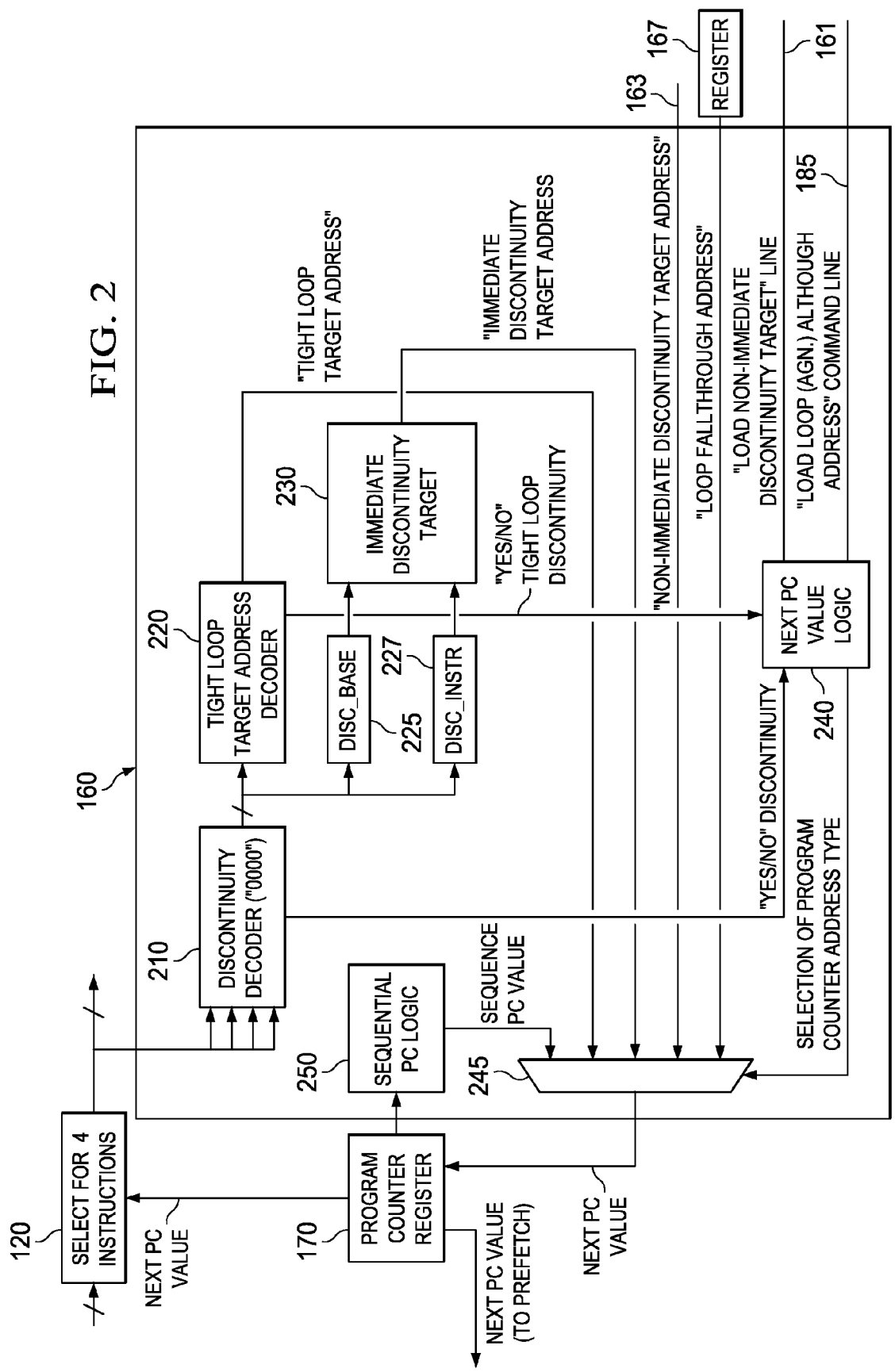
FIG. 2 illustrates a block diagram of a next PC controller of FIG. 1 in more detail.
Figure 4:
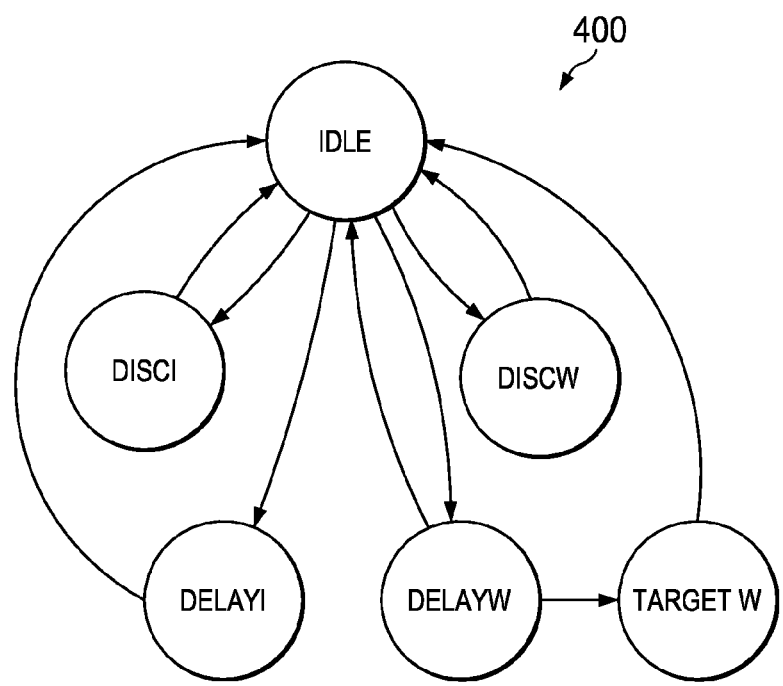
FIG. 4 illustrates one embodiment of a state diagram for detecting discontinuities, including tight loop discontinuities, implemented within the next PC value logic of FIG. 2.

A next PC value, generated by the next PC controller 160, generated based upon criteria as will be described in FIGS. 2 and 4, is loaded into the PC register 170. This next PC value is used by the selector 120 to select up to four new instructions that have been previously loaded into the cache line buffer 110.

These four new instructions are then loaded into the next PC controller 160 for the purpose of determining whether any of the four new instructions are discontinuity instructions, such as tight loop discontinuity instructions, as will be described in more detail in FIG. 2, below.

The next PC controller 160 receives further inputs from the register 170, the load loop fallthrough address 175, and the lines 161 and 163. The next PC controller 160 evaluates these inputs, as will be described below, to provide an updated PC value. This next PC value is conveyed to the program counter register 170. This next PC value is then conveyed to the selector 120 and to a prefetch 131 as a next PC value for a next round of instructions to be selected and decoded.

Turning now to FIG. 2, illustrated in more detail is a block diagram of the next PC controller 160 of FIG. 1 constructed according. The selector 120 is coupled to a discontinuity decoder 210 within the PC controller 160. In at least some embodiments, an instruction or packet of instructions has a marker (such as "0000") inserted within it by a compiler at a given location, as denoting that a given instruction or packet of instructions is a discontinuity instruction.

An output of the decoder 210 is coupled to a next PC value logic 240. The output of the decoder 210 conveys to a next PC value logic 240 whether at least one of the four instructions is a discontinuity instruction, and if so, which is the first discontinuity instruction.

In at least some embodiments, for timing purposes, all four instructions are analyzed together. However, a priority encoder (not illustrated) keeps all instructions in the fetch packet up to and including the first discontinuity, and discards the remaining instructions in the fetch packet. If the discontinuity is a tight loop instruction, the target instructions can be fetched in the next cycle. Otherwise, the PC will not fetch any more instructions until the branch target has been determined (i.e., the PC will stall for 1 or more cycles.)

In at least some embodiments, the determination of whether an instruction is a discontinuity instruction is performed with sequential logic circuits, thereby leading to a time-efficient approach, e.g., without a stall of a computer cycle. Furthermore, the determination of whether an instruction is a discontinuity instruction can then be used to determine whether to employ outputs of a tight loop target decoder 220 or, alternatively, an output of an immediate discontinuity target address 230, or neither of these.

Regardless of whether a discontinuity detection has occurred, copies of the four instructions are then conveyed, in parallel, to an tight loop ("agn") target decoder 220, and a discontinuity base decoder 225 and a discontinuity instruction decoder 227.

The again target decoder 220 determines if each instruction has a bit pattern in a given location of the instruction that matches a bit-pattern in a given location that is assigned to a "tight loop" instruction if the instruction is also a discontinuity instruction. The tight loop target decoder 220 conveys its determination whether if any, and if so which, of the instructions had a bit pattern that matches a bit pattern of a tight loop instruction to the next PC value logic 240. The again target 220 also conveys a calculated tight loop target value as an input to a multiplexer 245.

A discontinuity base decoder 225 and a discontinuity instruction (i.e., address offset) decoder 227 are coupled to a combined immediate discontinuity target decoder 230, an output of which is conveyed as another input to the multiplexer 245. An immediate discontinuity non tight loop discontinuity instruction is defined as a discontinuity instruction that, although the complete loop is not stored in a cache line buffer, the loop address can nonetheless be resolved without resorting to an address stored in a register separate from the cache line buffer.

However, it is entirely possible that an instruction that is not a discontinuity instruction, and recognized as a non-discontinuity instruction by the discontinuity decoder 210, might still be interpreted by the tight loop target address decoder 220 as a tight loop discontinuity instruction. This can be because a bit pattern at a select location of the non-discontinuity instruction is the same bit-pattern as found the tight loop discontinuity instruction. Also, in at least some embodiments, the tight loop target decoder 220 provides a target address regardless of whether or not it also detects a tight loop discontinuity instruction.

The discontinuity base immediate discontinuity target decoder 230 conveys a target address, though address calculation may take several cycles to occur depending upon the format of the discontinuity instruction. Further, as discussed above, the answer they yield is not correct if the instruction is not a discontinuity instruction, as determined by the discontinuity decoder 220. If the instruction is a discontinuity instruction, the discontinuity instruction is a tight loop discontinuity instruction in order for an output of the decoder 220 to be correct.

Therefore, as will be described in more detail below when discussing the next PC value logic 240, the discontinuity decoder 210 detects a discontinuity for a given instruction as a prerequisite for the next PC value logic 240 to select an output of either the target decoder 220 or the immediate discontinuity target decoder 230. The discontinuity decoder 210 and the tight loop decoder 220 can both decode in series a plurality of instructions during a same single computer clock cycle, and the tight loop decoder 220 can provide the tight loop instruction address in the same single computer clock cycle.

The next PC value is conveyed from the multiplexer 245 to the program counter register 170. The multiplexer 245 has a plurality of inputs, and one of the inputs is selected by the next PC value logic 240 to be a next PC value. The multiplexer 245 has three inputs in addition to inputs from the decoders 220, 230. A first additional input is a sequential PC value from a sequential PC logic 250. The sequential PC logic 250 reads the PC value from the register 170, and then increments it to its next value, such as by a value of four instructions. This is the default next PC value if no discontinuity instruction is received or detected, and no fallthrough address command is received.

A second additional input of the multiplexer 245 is coupled to a non-immediate discontinuity target address line. Generally, the non-immediate discontinuity target address line refers to a discontinuity PC value that has been calculated by a pipeline, and an address register was employed to determine its value. This value is conveyed to the multiplexer 245 from outside the next PC logic 160, and for that matter, the system 100. A third additional input of the multiplexer 245 is coupled to a loop again fallthrough address.

As described above, the next PC control 240 is coupled as a selector to the multiplexer 245. Generally, the next PC value logic 240 employs a determination as to whether there is a discontinuity in any of the four instructions, as determined by the discontinuity decoder 210. In some embodiments, if no discontinuity, the next PC control logic is configured to provide a signal command to select an output of the coupled sequential PC logic 250 if the discontinuity decoder does not detect a discontinuity instruction.

If there is a discontinuity instruction, and the tight loop target address decoder 220 determines that this is a tight loop, the next PC value logic 240 selects the target address as the next PC value for the program count register, without a stall, due to the nature of the sequential, combinational logic used in the target address decoder 220.

However, should the discontinuity decoder 210 determine that at least one of the four instructions is a discontinuity instruction, but the discontinuity instruction is not a tight loop instruction as determined by the tight loop logic 220, the next PC value logic 240 waits, with a stall of at least one clock cycle, until the immediate discontinuity instruction target logic 230 has calculated a target address of the immediate discontinuity target. This is conveyed to the multiplexer 245, which is then selected by the next PC value logic 240 as the next PC value. In at least some embodiments, the discontinuity instruction has been previously identified as a discontinuity instruction by a compiler, and a tight loop discontinuity instruction has also been previously identified as a tight loop discontinuity instruction by a compiler.

However, the outputs of the tight loop target address decoder 220, the immediate discontinuity decoder 230, and the sequential logic 250 can be overridden, and instead another input to the multiplexer 245 can be selected. The next PC value logic 240 can also receive a load non-immediate discontinuity target command and a load loop fallthrough address command through their respective lines. If the next PC value logic 240 receives either one of these commands, the PC values associated with these commands are selected to be conveyed to the program counter register 170, instead, thereby overriding any determinations made by the decoders 220, 230.

Figure 3:
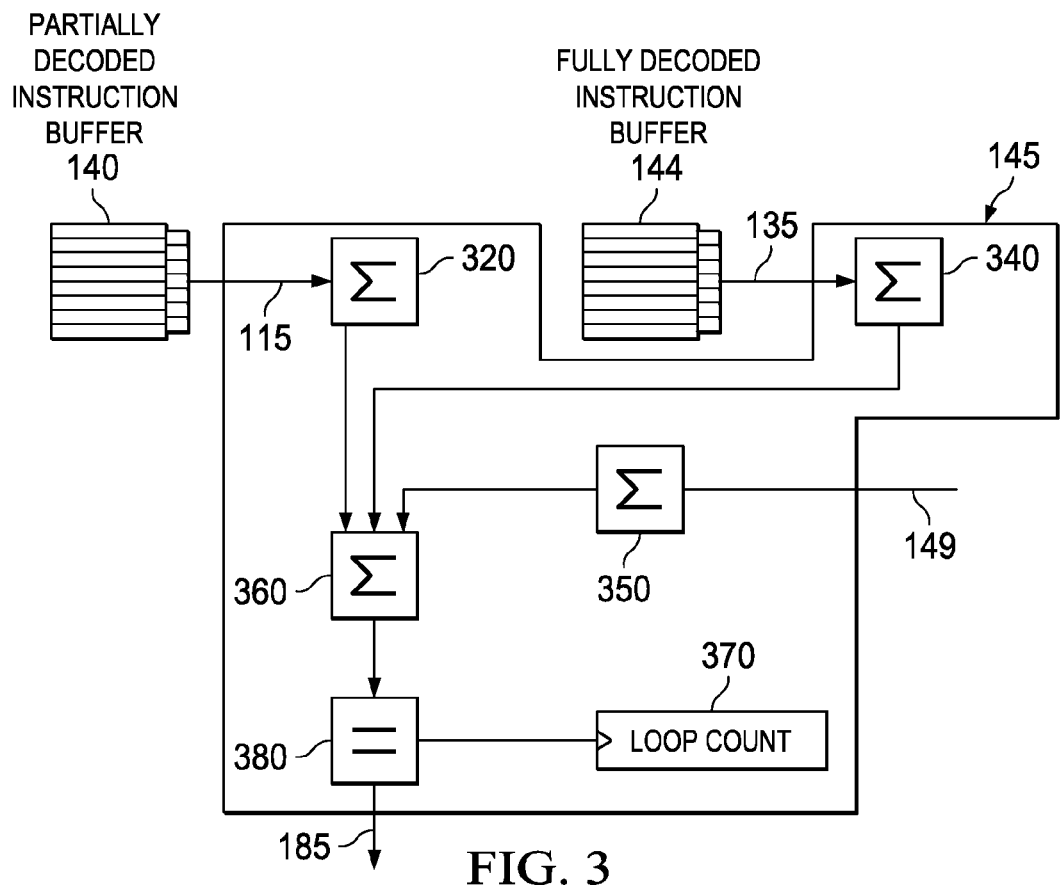
FIG. 3 illustrates a block diagram of fallthrough logic associated with the next PC controller of FIGS. 1 and 2.

Turning now to FIG. 3, illustrated in more detail is a block diagram of the fallthrough logic 145. The partially decoded instruction buffer 140 is coupled through the line 115 to the loop fallthrough logic 145. The fully decoded instruction buffer 144 is coupled through the line 135 to the loop fallthrough logic 145. The loop fallthrough logic 145 also has, as an output, a signal through line 147, the "load loop fallthrough address" command line, coupled to the next PC value generator 150 (not illustrated).

Within the loop fallthrough logic 145, an aggregator 320 is coupled to the line 115. Within the aggregator 320, all instances of a same tight loop discontinuity that are within the partially decoded instruction buffer 140 are aggregated. Similarly, an aggregator 340 is coupled to the line 135. All instances of the same tight loop discontinuity that are within the fully decoded instruction buffer 144 are aggregated. Also, within the loop fallthrough logic 145, an aggregator 350 is coupled to the tight loop in pipeline line 149. Within the aggregator 350, all instances of a tight loop discontinuity iteration within later stages of the pipelines are aggregated.

In at least some embodiments, in any given cycle, the number of iterations that are queued up is compared to a present value of a loop counter 370. Hence, loop iterations that have already been executed have already updated a loop count register 370, and are therefore implicitly included in a comparison, such as shall be detailed below. For instance, if 100 iterations of a loop are to be executed, and 97 iterations have already completed, the loop counter value in the loop count register 370 will be "three." If three iterations of the loop detected in the pipeline, then the loop fallthrough logic will load the PC value with the fallthrough address, since all iterations of the loop have been dispatched.

Counts generated by the aggregators 320, 340, and 350 are then conveyed to a loop aggregator 360. This totals the number of tight loop iterations in the various stages of the pipelines. The total count of the loops in the various pipelines is then conveyed to a comparator 380. The comparator 380 compares an input of the total number of executed or pending loop counts to an output of the loop count register 370, which stores the total number of loop to be executed for a given tight loop. If these are the same number, the loop fallthrough address provides the load loop fallthrough address command.

In at least some embodiments, the system 100 supports four levels of nesting, and independent statistics for four different loop counters can be maintained. However, regarding the PC value, only one loop is active in a given clock cycle. For instance, consider the nested loop assembly code below:

```
Target1: add
         add
Target0: sub
         agn0 Target0
         agn1 Target1
```

The instructions "agn0" and "agn1" may be fetched together, but will never be dispatched together, because the first discontinuity in a fetch packet ("agn0") will cancel out the subsequent instruction ("agn1"). Only once "agn0" has actually completed all of its iterations (i.e., once the PC value "falls through") will the instruction agn1 be encountered. Hence, when calculating the PC value, it is only needed to consider exit conditions for a currently "active" loop.

Turning now to FIG. 4, illustrated is one embodiment of a state diagram employed by the next PC value logic 240 for determining which next PC value should be selected from a plurality of inputs. In the "IDLE" state, the next PC value logic 240 selects the sequential PC value, if no tight loop discontinuity instruction is encountered; otherwise, the next PC value logic 240 selects a tight loop instruction address. In one embodiment, a tight loop instruction has an offset of eight bit address bits. Both sequential and tight loop calculation and selection occurs without any stalls.

However, if an immediate discontinuity with no branch delay slots is encountered, the next PC state machine goes to the "DISCI" state, where it stalls for one cycle. A count of branch delay slot counts are also conveyed to the next PC value logic 240. Then the next PC value logic 240 selects the immediate discontinuity target address to be conveyed to the PC register 170.

Generally, a branch delay slot is an instruction that follows a "delayed branch" and is executed regardless of the branch outcome (taken or not taken). For instance, consider the following four instructions: 0—add; 1—add; 2—branch if a condition is true; 3—subtract. If instruction 2 is a regular branch, instruction 3 is only executed if the condition is not true (i.e., if the branch is not taken). However, if instruction 2 is a delayed branch, instruction 3 is executed regardless of whether or not the branch is taken. Note that the principle of delay slots can be extended to "n" number of instructions that follow a delayed branch.

However, if an immediate discontinuity with branch delay slots is encountered, the next PC state machine advances to the "DELAYI" state, where the next PC control logic 260 allows for the slot instructions to execute before taking the branch target.

In at least some embodiments, the system 100 supports branch delay slot sizes from 1 to 16 words. Once a delayed branch is encountered, the system 100 calculates a number of words in the branch delay slot and generates an "end of delayed branch address" along with the branch target address.

The system 100 can keep fetching instructions sequentially until the "end of delayed branch address" is reached, and then begin fetching at the branch target address.

As illustrated, if a non-immediate discontinuity is encountered through input of the load non-immediate discontinuity target command, by the next PC value logic 240, the next PC state machine examines this command, and goes to a "DISCW" state if there are no branch slot delays, and the "DELAYW" state if there are branch slot delays.

In the "DISCW" state, the state machine returns to the idle state once the branch target has been calculated (outside of the next PC value generator 150), as determined by commands conveyed across the various input lines. The non immediate discontinuity target address 163 is selected by the controller 160 and conveyed to the program counter register 170. However, if the state machine is in the "DELAYW" state and has finished processing delay slot instructions before the branch target has been calculated, it waits in the "TARGETW" state until the branch target has been calculated before returning to the idle state.

Turning now to FIG. 5, illustrated is a method 500 for use of a program counter value. In at least some embodiments, the following steps can be performed in the system 100 as illustrated in FIGS. 1-4.

In a step 510, an instruction packet of one or more instructions is loaded into a buffer through use of a PC value as an address of the instruction packet to select the instruction packet. In a step 520, it is determined if a command to load a non-immediate discontinuity target address to a next PC value has been received. If a command to load a non-immediate discontinuity target address to a next PC value has been received, advance to a step 525. If not, the method 500 advances to a step 530.

In the step 525, the provided non-immediate discontinuity target address is loaded to the next PC value, after a stall. Then the method 500 carries out the step 510 again.

In the step 530, it is determined if a command to load a fallthrough address has been received. If received, the method 500 advances to a step 535. If not received, the method 500 advances to a step 540.

In the step 535, a fallthrough address is loaded to the next PC value, without a stall. Then the method 500 carries out the step 510 again.

In a step 540, it is determined whether at least one instruction of the instruction packet is a discontinuity instruction. If not, advance to a step 545. If yes, advance to a step 550.

In the step 545, the next PC value is loaded, without a stall, with a sequential program counter value. Then the method 500 carries out the step 510 again.

In the step 550, it is determined whether the discontinuity instruction is a detected in the step 540 is a tight loop discontinuity instruction. If it is not a tight loop discontinuity instruction, the method 500 advances to a step 555. If it is a tight loop, then the method advances to a step 560.

In the step 555, the next PC value is loaded with a sequential program counter value, with a stall. Then, the method carries out the step 510 again. In at least some embodiments, the stall can be attributable to varying lengths and formats of immediate discontinuity target commands and addresses, unlike tight loop discontinuity addresses, which are detectable through sequential logic circuits in a single computer clock cycle.

In the step 560, a next PC value is loaded, without a stall, with a tight loop target address. Then the method carries out the step 510 again.

Those skilled in the art to which the invention relates will appreciate that other and further additions, deletions, substitutions and modifications may be made to the described embodiments without departing from the scope of the invention.

What is claimed is:

1. A method of use of a next program counter (PC) value, comprising:
    loading an instruction packet of one or more instructions, into a buffer through use of said next PC value as an address of said instruction packet to select said instruction packet;
    determining whether said instruction packet contains a discontinuity instruction;
    loading, without a stall, said next PC value with a target discontinuity address of said discontinuity instruction if:
        a) said instruction packet contains said discontinuity instruction, and
        b) if said discontinuity instruction is a tight loop instruction; and
    loading, with a stall, a fallthrough address to said next PC value, wherein said fallthrough address to said next PC value occurs when said discontinuity instruction is a tight loop discontinuity instruction that has completed all iterations of a loop.

2. The method as recited in claim 1 further comprising loading, after a calculation and a stall, said next PC value with an immediate discontinuity target address if said discontinuity instruction is not said tight loop instruction.

3. The method as recited in claim 1 further comprising loading, without a stall, said next PC value with a sequential PC value if there is no discontinuity instruction in a second instruction packet.

4. The method as recited in claim 1 further comprising loading, after a plurality of computer cycle stalls, a non-immediate discontinuity target address to said next PC value if said discontinuity instruction is not an immediate discontinuity instruction or a tight loop discontinuity instruction.

5. The method as recited in claim 1 further comprising determining whether a second instruction of said at least one instruction is a discontinuity instruction.

6. The method as recited in claim 1 further comprising determining whether said discontinuity instruction is a tight loop instruction.

7. A next program counter (PC) value generator, comprising:
    a discontinuity decoder that is provided to detect a discontinuity instruction among a plurality of instructions;
    a tight loop decoder coupled to said discontinuity decoder and configured to:
        a) detect a tight loop instruction, and
        b) provide a tight loop instruction target address;
    a next PC value logic having a first input coupled to an output of said discontinuity decoder and a second input coupled to an output of said tight loop decoder, said next PC value logic configured to provide, without a stall, a control signal that a next PC is to be loaded with said tight loop instruction target address if:
        said discontinuity decoder detects a discontinuity instruction, and
        said tight loop decoder detects a tight loop instruction;
    wherein said next PC value logic has coupled, into a fourth input, a loop fallthrough address command line that can cause said next PC value logic to override said first and second inputs.

8. The next PC value generator as recited in claim 7 wherein said next PC value logic is provide to provide a signal to select an output of a coupled sequential PC generator if said discontinuity decoder does not detects said discontinuity instruction.

9. The next PC value generator as recited in claim 7 further comprising a multiplexer having a plurality of inputs, said inputs selected among by an output of next PC value logic, wherein:
   a first input of said multiplexer is a tight loop target address line; and
   a second input of said multiplexer is an immediate discontinuity non-tight loop target address line.

10. The next PC value generator as recited in claim 7 further comprising:
   wherein said discontinuity decoder and said tight loop decoder can both decode a plurality of instructions during a same single computer clock cycle; and
   wherein said tight loop decoder can provide said tight loop instruction target address in said same single computer clock cycle.

11. The next PC generator as recited in claim 10 wherein said discontinuity instruction is detected by said discontinuity decoder through a detection of a marker string encoded in a specified position of said instruction.

12. The next PC generator as recited in claim 7 wherein a non-tight loop discontinuity instruction is stalled for at least one computer clock cycle until said non-tight loop discontinuity instruction is decoded.

13. The next PC generator as recited in claim 7 wherein said next PC value logic has coupled, into a third input, a load non-immediate discontinuity target address command line that can cause said next PC value logic to override said first and second inputs.

14. The next PC generator as recited in claim 7 wherein a compiler has previously identified said discontinuity instruction as a discontinuity instruction.

15. The next PC generator as recited in claim 14 wherein a compiler has previously identified said tight loop discontinuity instruction as a tight loop discontinuity instruction.

16. The next PC generator as recited in claim 7 wherein said discontinuity detection is in a same clock cycle as said tight loop detection.

17. The next PC generator as recited in claim 7 wherein said plurality of instructions is contained in an instruction packet.

18. A system for use with a program counter register (PC), comprising:
   a next PC controller including:
      a) a discontinuity decoder that can detect a discontinuity instruction among a plurality of instructions; and
      b) a tight loop decoder that both:
         i) detects a tight loop instruction in a single clock cycle, and
         ii) provides a tight loop instruction target address in said same single clock cycle;
   a partially decoded instruction buffer;
   a decoded instruction buffer; and
   loop fallthrough logic coupled to:
      a) an input of said next PC value logic, and
      b) both said partially and fully decoded instruction buffers;
   wherein said fallthrough logic is provide to command said next PC value logic to load a fallthrough address to said PC, wherein said fallthrough logic aggregates a count of number of loop instructions in at least said partially decoded instruction buffer and said decoded instruction buffer, and compares said count to a loop count of iterations of executed loops to determine whether to generate said command said next PC value logic.

19. The system as recited in claim 18 wherein said partially decoded instruction buffer has instructions stored therein at a different average rate, for a plurality of clock cycles, than it is depleted of said instructions.

20. The system as recited in claim 19 wherein a conveyance of at least one instruction of said plurality of said instructions to said partially decoded instruction buffer is stalled by a discontinuity instructions among said plurality of instructions that is other than a tight loop.

21. The system as recited in claim 19 wherein a conveyance from said partially decoded instruction buffer to said fully decoded instruction buffer is stalled by a dependency of a second instruction later in a pipeline.

22. The system as recited in claim 18 further comprising:
   a cache line buffer; and
   a selector, coupled to said cache line buffer and said next PC value generator, that selects a plurality of instructions from said cache line buffer as determined by a next PC value generated by said next PC value logic.

23. The system as recited in claim 18 further comprising a prefetch coupled to said next PC value generator.

* * * * *